(No Model.)

C. W. CHISHOLM.
CAR COUPLING.

No. 369,502. Patented Sept. 6, 1887.

WITNESSES:

INVENTOR:
C. W. Chisholm
BY Munn & Co.
ATTORNEYS.

UNITED STATES PATENT OFFICE.

CHARLES WILLIAM CHISHOLM, OF WINNIPEG, MANITOBA, CANADA.

CAR-COUPLING.

SPECIFICATION forming part of Letters Patent No. 369,502, dated September 6, 1887.

Application filed April 22, 1887. Serial No. 235,736. (No model.)

*To all whom it may concern:*

Be it known that I, CHARLES WILLIAM CHISHOLM, of Winnepeg, in the Province of Manitoba and Dominion of Canada, have invented a new and Improved Car-Coupling, of which the following is a full, clear, and exact description.

This invention relates to automatic car-couplings of that class wherein a pivoted pin, hook, or dog is employed to engage the coupling-link and hold it in position within the draw-head, the object of the invention being to provide a simple, cheap, durable, and efficient coupling which shall be automatic in its action of coupling, but which may be set so that it will be upheld in a position to allow for the uncoupling of the cars, the parts, however, being so arranged that as the coupling-link is withdrawn from the draw-head the coupling hook or dog will be returned to a position for automatic coupling, all as will be hereinafter more fully described, and specifically pointed out in the claim.

Reference is to be had to the accompanying drawings, forming a part of this specification, in which similar figures of reference indicate corresponding parts in all the views.

Figure 1:
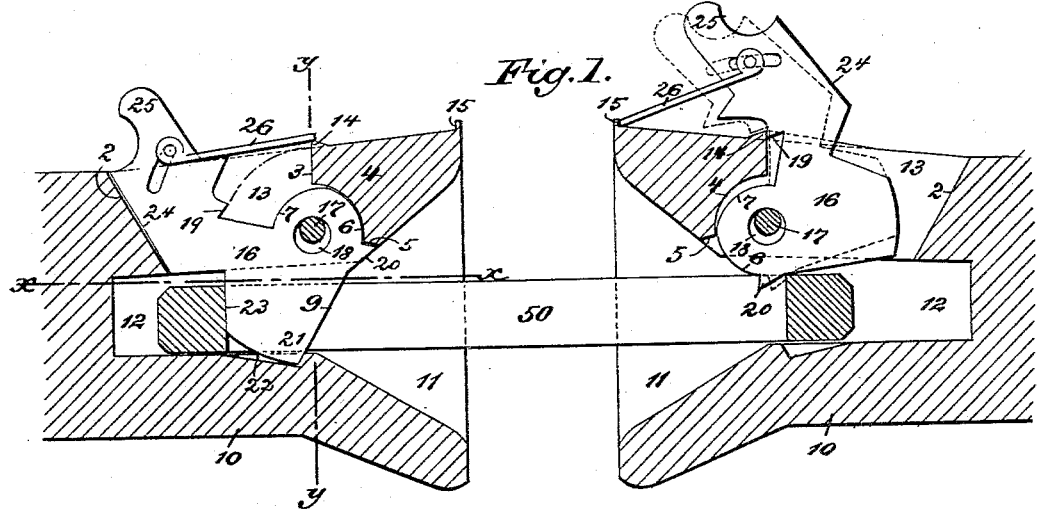
Figure 2:
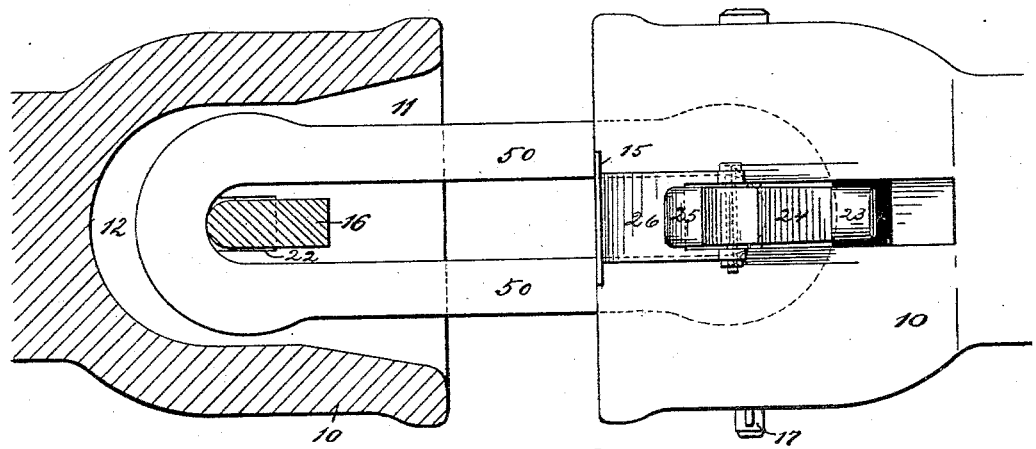
Figure 3:
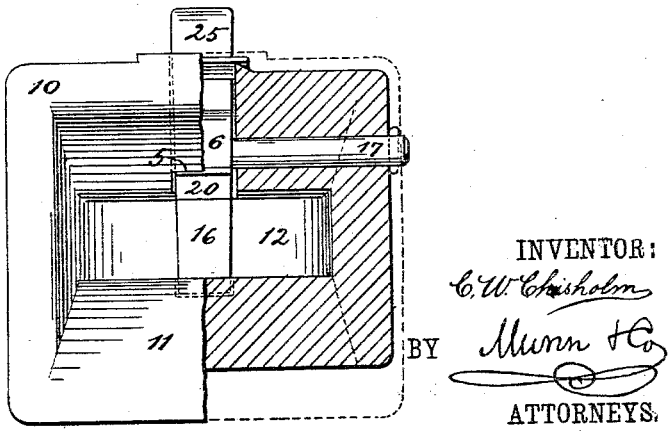

Figure 1 is a central longitudinal sectional view of so much of two draw-heads and their connections as is necessary to illustrate my invention, the coupling-dog upon the left being represented as it appears when in a position to couple the cars, while the dog upon the right is represented as it appears at the time the link is entering the draw-head. Fig. 2 is a plan view of two draw-heads, the one upon the right being shown, however, in section—that is, taken upon a line corresponding with that of the line $x\,x$ of Fig. 1; and Fig. 3 is an end view of a draw-head that is provided with my improved coupling, the right-hand portion of the draw-head being shown in section, said section being taken upon a line corresponding with that of the line $y\,y$ of Fig. 1.

In the drawings, 10 represents a draw-head that is provided with a flaring mouth, 11, and a recess, 12, the lower defining-wall of which recess is practically in a horizontal plane, while the upper wall flares upward from the inner end of the recess toward the mouth of the draw-head. A vertical slot, 13, is formed in the upper part of the draw-head, the rear defining-wall of this slot being inclined, as shown at 2 in Fig. 1, while the upper portion of the forward defining-wall is vertical, as shown at 3, and the lower portion concave, as shown at 4, a shoulder, 5, being formed at the lower end of the concave portion 4. Upon the upper face of the draw-head, and directly in advance of the slot 13, there is formed a boss or projection, 14, while at the extreme forward edge of the draw-head there is a flange, 15.

Within the slot 13, I mount a coupling dog, pin, or hook, 16, said dog, pin, or hook being supported by a pivot, bolt, or pin, 17, which passes through an aperture, 18, that is formed in the dog, the aperture being of greater diameter than is the pin which supports the dog. This locking-dog is provided with a curved bearing-face, 6, which, when the dog is in the position shown upon the left in Fig. 1, is concentric with the curve of the concave face 4, a second curved face, 7, being formed at the rear of the face 6, this face, however, being eccentric to the face 4 when the dog is in the position in which it is shown upon the right in Fig. 1.

Above the face 7 there is formed a shoulder, 19, which is adapted to be thrown into engagement with the boss 14, as indicated by dotted lines upon the right in Fig. 1, while below the convex face 6 there is formed a projection, 20, the rear or lower face of which is inclined, as indicated, the forward and upper face bearing against the shoulder 5 when the dog is in the position in which it is shown upon the left in Fig. 1.

When in the coupling position, the lower point, 21, of the dog 16 rests within a recess, 22, formed in the lower portion of the draw-head just within its mouth 11. The rear portion of the lower projection, 21, constitutes the bearing-face of the dog, which bearing-face is shown at 23, and the main body of the dog extends above and to the rear of this bearing-face. The parts are so proportioned that when the dog is in the coupling position its rear face, 24, will bear against the inclined face 2 of the slot 13. The dog extends somewhat beyond the upper face of the draw-head, and this extending portion, which is shown at 25, constitutes the handle or lug by which the dog is manipulated.

A metallic cover, 26, is pivotally connected to the projection 25, and serves to close the open portion of the slot 13 when the parts are in coupling position, thus preventing the entrance of gravel, snow, &c.

Such being the general construction of my improved form of coupling, the operation is as follows: We will suppose the dog 16 to be in the position in which it is shown upon the left in Fig. 1. Thus, as the link 50 enters the mouth of the draw-head, it will strike against the forward inclined face, 9, of the dog 16, and will force said dog to the position in which it is shown in full lines upon the right in Fig. 1; but after the link has passed the dog said dog will drop back to the position in which it is shown upon the left in Fig. 1. If, now, it should be desired to lock the dog for the time being in a position so that the link may be withdrawn from the draw-head, the dog would be drawn upward until its shoulder 19 was brought into engagement with the boss 14 of the draw-head, the link at this time being within the recess 12, and it will be seen that the dog, having been so placed, will be held in the position indicated until the link is drawn out of the link-recess; but as the link is so drawn out of the link-recess it will strike against the inclined face of the lug or projection 20 and throw the shoulder 19 from engagement with the boss 14, and the dog will then return to the position in which it is shown upon the left in Fig. 1—that is, to a position for automatic coupling.

From the foregoing description it will be seen that the coupler may be used without fear of danger to the train-hands, and that the parts will always be in a position for automatic coupling after the cars in connection with which the couplers are arranged have been uncoupled.

In order that the coupling-dog may be prevented from jamming within the slot 13, I form said dog narrower at the bottom than at the top, as is probably best shown in Fig. 3.

Having thus fully described my invention, I claim as new and desire to secure by Letters Patent—

The combination, with a draw-head formed with a recess, 22, and a slot, 13, of a coupling-dog, 16, mounted upon a pivot, pin, or bolt and arranged to enter the recess 22, the coupling-dog being formed with a shoulder, 19, a slot, 13, between said shoulder and a curved face, 7, a projection, 20, a forward inclined face, 9, and a projection, 25, which extends outward beyond the draw-head, which shoulder 19 passes over or upon a shoulder, 14, of the draw-head, and which slot 13 receives the wall 3 of said recess 22, substantially as described.

CHARLES WILLIAM CHISHOLM.

Witnesses:
JOHN O'REILLY,
WALTER KEEN.